US011062458B2

(12) United States Patent
Yokoyama et al.

(10) Patent No.: US 11,062,458 B2
(45) Date of Patent: Jul. 13, 2021

(54) APPEARANCE INSPECTION DEVICE, TRANSFORMATION DATA GENERATION DEVICE, AND PROGRAM

(71) Applicants: DENSO CORPORATION, Kariya (JP); MEIJO UNIVERSITY, Nagoya (JP)

(72) Inventors: Yoshio Yokoyama, Kariya (JP); Yoshitaka Sakamoto, Kariya (JP); Kazuhiro Hotta, Nagoya (JP); Tomokazu Murata, Nagoya (JP)

(73) Assignees: DENSO CORPORATION, Kariya (JP); MEIJO UNIVERSITY, Nagoya (JP)

( * ) Notice: Subject to any disclaimer, the term of this patent is extended or adjusted under 35 U.S.C. 154(b) by 0 days.

(21) Appl. No.: 16/704,816

(22) Filed: Dec. 5, 2019

(65) Prior Publication Data
US 2020/0111217 A1    Apr. 9, 2020

Related U.S. Application Data

(63) Continuation of application No. PCT/JP2018/021593, filed on Jun. 5, 2018.

(30) Foreign Application Priority Data

Jun. 6, 2017    (JP) .............................. JP2017-111572

(51) Int. Cl.
*G01N 21/88*    (2006.01)
*G06K 9/62*    (2006.01)
(Continued)

(52) U.S. Cl.
CPC ......... *G06T 7/168* (2017.01); *G01N 21/8851* (2013.01); *G06T 7/0008* (2013.01);
(Continued)

(58) Field of Classification Search
None
See application file for complete search history.

(56) References Cited

U.S. PATENT DOCUMENTS

2019/0295237 A1*  9/2019  Konecky ................. G06T 7/174
2020/0111217 A1*  4/2020  Yokoyama ............. G06N 3/088
(Continued)

FOREIGN PATENT DOCUMENTS

JP          5546317 B2      7/2014
JP      2017-219529 A     12/2017
WO  WO-2018225745 A1 * 12/2018 ............... G06K 9/00

OTHER PUBLICATIONS

Lv et al., "Few-shot Learning Combine Attention Mechanism-Based Defect Detection in Bar Surface," ISIJ International, vol. 59 (2019), No. 6, pp. 1089-1097 (Year: 2019).*

(Continued)

*Primary Examiner* — Soo Shin
(74) *Attorney, Agent, or Firm* — Harness, Dickey & Pierce, P.L.C.

(57) ABSTRACT

An extraction section extracts, from each of a plurality of non-defective product images which show the appearance of the inspection target determined to be a non-defective product, the non-defective vector representing a feature of each non-defective product image. A generation section generates a transformation matrix by using a plurality of non-defective product vectors extracted by the extraction section. The transformation matrix is a matrix representing sequentially performing first mapping for mapping the feature vector to a feature space and second mapping for mapping a result of the first mapping to the whole space to which the feature vector belongs. An adjusting section adjusts each element of the transformation matrix generated by the generation section by using, as learning data, the feature vector extracted from a pseudo defect image.

6 Claims, 8 Drawing Sheets

(51) Int. Cl.
  *G06N 3/04*     (2006.01)
  *G06N 3/08*     (2006.01)
  *G06T 7/00*     (2017.01)
  *G06T 7/11*     (2017.01)
  *G06T 7/68*     (2017.01)
  *G06T 7/174*    (2017.01)
  *G06T 7/168*    (2017.01)

(52) U.S. Cl.
  CPC ............... *G06T 7/11* (2017.01); *G06T 7/174* (2017.01); *G01N 2021/8864* (2013.01); *G06T 2207/20081* (2013.01); *G06T 2207/20084* (2013.01)

(56) References Cited

U.S. PATENT DOCUMENTS

2020/0125889 A1*  4/2020  Okamoto ............. G06K 9/6269
2020/0211169 A1*  7/2020  Tsutsumi ............. G06K 9/6256

OTHER PUBLICATIONS

Landström et al., "Morphology-Based Crack Detection for Steel Slabs," IEEE Journal of Selected Topics in Signal Processing, vol. 6, No. 7, Nov. 2012 (Year: 2012).*

* cited by examiner

DIVIDE

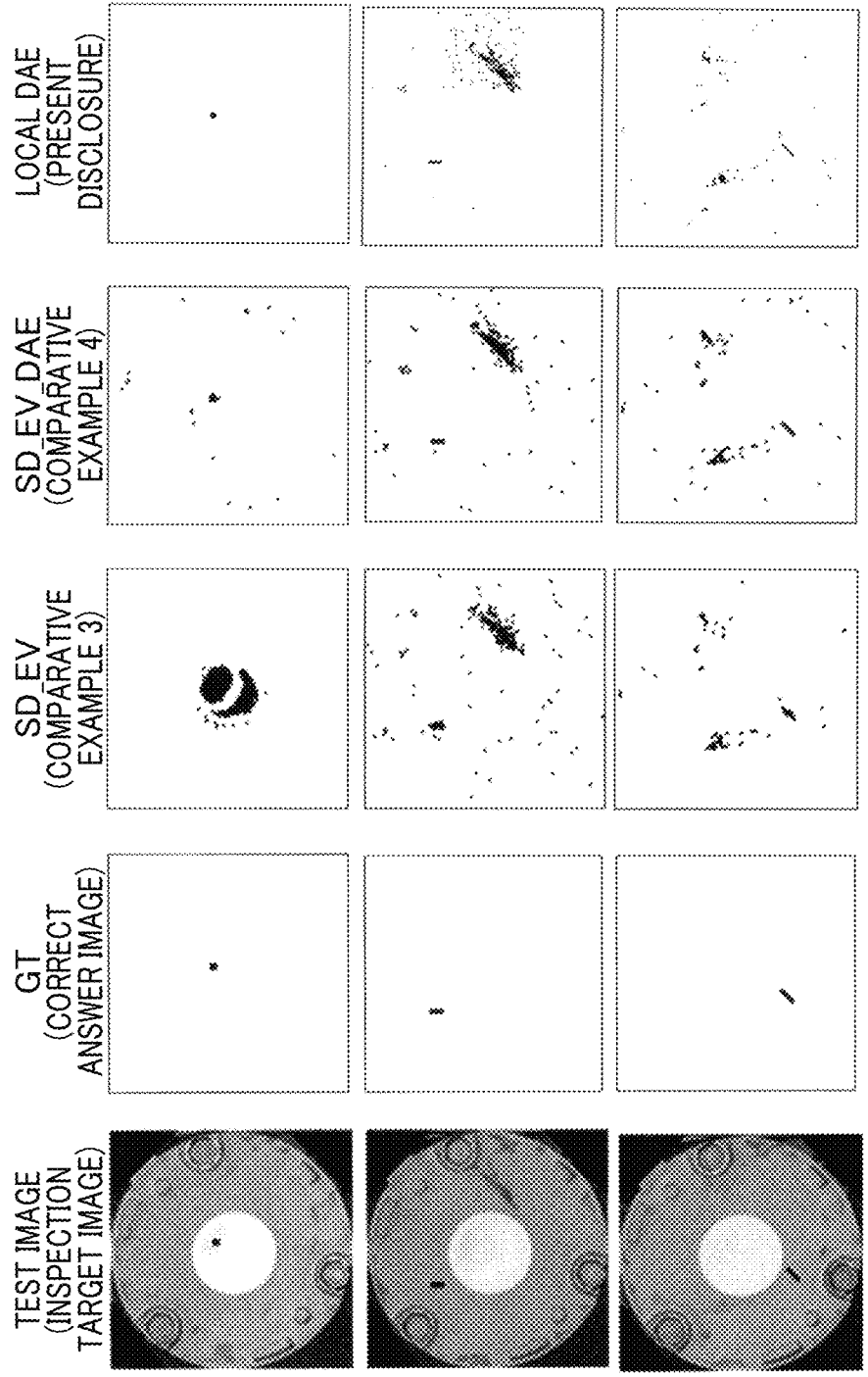

APPEARANCE INSPECTION DEVICE, TRANSFORMATION DATA GENERATION DEVICE, AND PROGRAM

CROSS-REFERENCE TO RELATED APPLICATION

The present application is a continuation of International Patent Application No. PCT/JP2018/021593, filed on Jun. 5, 2018, which designated the U.S. and claims the benefit of priority from Japanese Patent Application No. 2017-111572 filed with the Japan Patent Office on Jun. 6, 2017. The entire disclosures of all of the above applications are incorporated herein by reference.

BACKGROUND

Technical Field

The present disclosure relates to a technique for inspecting the appearance of an inspection target by using an image.

Related Art

A technique for determining whether an inspection target is a defective product or not is known which, in order to save labor or improve inspection accuracy in the inspection step, analyzes an inspection image obtained by imaging the inspection target to detect results such as defects on a surface of the inspection target.

SUMMARY

As an aspect of the present disclosure, an appearance inspection device is provided which including: an acquisition section configured to acquire an inspection target image representing an appearance of an inspection target; a restoring section configured to generate a restored image representing an appearance determined to be a non-defective product from the inspection target image acquired by the acquisition section by using preset transformation data; a judging section configured to determine whether the inspection target captured in the inspection target image is defective or not from a difference between the inspection target image and the restored image; an extraction section configured to extract, from each of a plurality of non-defective product images which shows the appearance of the inspection target determined to be a non-defective product, a non-defective product vector which is a feature vector representing a feature of each non-defective product image; a generation section configured to generate a transformation matrix by using the non-defective product vectors extracted by the extraction section, the transformation matrix being a matrix representing sequentially performing first mapping for mapping the feature vector to a feature space and second mapping for mapping a result of the first mapping to the whole space, the whole space being a vector space represented by the feature vector, the feature space being a subspace of the whole space that approximates a distribution of the non-defective product vector; and an adjusting section configured to adjust each element of the transformation matrix generated by the generation section by using the feature vector extracted from a pseudo defect image obtained by combining the non-defective product image with an image representing a defect as learning data.

The restoring section is configured to use the transformation matrix adjusted by the adjusting section as the transformation data.

BRIEF DESCRIPTION OF THE DRAWINGS

In the accompanying drawings:

FIG. 9 is an explanatory diagram showing error images obtained upon appearance inspection in comparison with other approaches, together with test images and correct answer images.

DETAILED DESCRIPTION OF THE PREFERRED EMBODIMENTS

A technique for determining whether an inspection target is a defective product or not is known which, in order to save labor or improve inspection accuracy in the inspection step, analyzes an inspection image obtained by imaging the inspection target to detect results such as defects on a surface of the inspection target.

JP 5546317 B discloses a technique for learning a discriminator used for appearance inspection. That is, defect images including defects such as scratches on a surface of the inspection target are generated in a simulated manner. The boundary between a non-defective product and a defective product is roughly determined from the generated pseudo defect images. According to the determined boundary, a large number of feature values of defect images to be determined as non-defective products and feature values of defect images to be determined as defective products are generated as learning samples. The discriminator for appearance inspection is learned using the generated learning samples.

However, as a result of detailed examination by the inventor, the following problems were found with a conventional art described in JP 5546317 B. That is, in the conventional prior art, the method of determining the boundary between a non-defective product and a defective product is not objective and not quantitative, but is ambiguous. Further, in the conventional art, the inspection capability for an unknown defect that is not represented by the pseudo defect images is unknown.

An aspect of the present disclosure is to provide a technique for improving accuracy of an appearance inspection of an inspection target.

An embodiment of the present disclosure will be described with reference to the drawings.

1. Configuration

Figure 1:
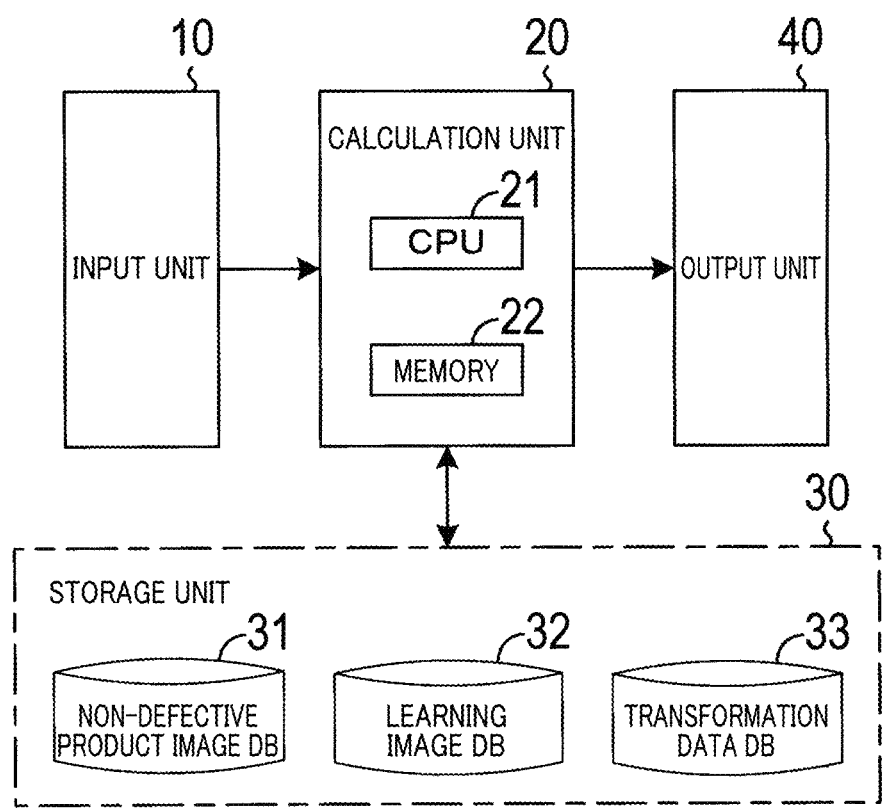
FIG. 1 is a block diagram showing the configuration of an appearance inspection device.

An appearance inspection device 1 shown in FIG. 1 includes an input unit 10, a calculation unit 20, a storage unit 30, and an output unit 40.

The input unit 10 receives images obtained by imaging the appearance of the inspection target under the same imaging conditions. The inspection target can be various industrial products or parts of industrial products. The received images include an inspection target image and a non-defective product image. The inspection target image is an image obtained by imaging the inspection target to be determined whether it is defective or not. The non-defective product image is an image obtained by imaging a known inspection target that has been determined to be non-defective.

The calculating unit 20 includes a microcomputer including a CPU 21 and a semiconductor memory (hereinafter also referred to as memory 22) such as RAM, ROM, or flash memory. Various functions of the calculation unit 20 are implemented by the CPU 21 executing programs stored in a non-transitory tangible storage medium. In this example, the memory 22 corresponds to the non-transitory tangible storage medium for storing programs. Further, a method corresponding to the programs is performed by execution of the program. The calculation unit may include one microcomputer or a plurality of microcomputers.

The processes for implementing the functions of the calculation unit 20 include an appearance inspection process and a transformation data generation process. The details of these processes will be described later. The way of implementing these processes by the calculation unit 20 is not limited to software, and a part or all of the elements may be implemented by using one or more hardware components. For example, when the above functions are implemented by an electronic circuit which is hardware, the electronic circuit may be implemented by a digital circuit including a large number of logic circuits, an analog circuit, or a combination thereof.

The storage unit 30 includes a nonvolatile read-write memory. The storage unit 30 may be, for example, an HDD, a flash memory, or a USB memory that is detachable from the computer. In the storage unit 30, a plurality of databases (hereinafter referred to as DBs) are constructed. Specifically, the storage unit 30 includes a non-defective product image DB 31, a learning image DB 32, and a transformation data DB 33. In the non-defective product image DB 31, a plurality of non-defective product images used for generating transformation data are accumulated. In the learning image DB 32, pseudo defect images used as learning data when adjusting the transformation data are accumulated. The pseudo defect images are generated by the transformation data generation process. In the transformation data DB 33, transformation data used when generating a restored image from the inspection target image is stored. The transformation data is generated by the transformation data generation process as with the pseudo defect image.

The output unit 40 has at least a display screen, and is capable of displaying at least one of the determination result of the non-defective/defective determination conducted by the appearance inspection process of the calculation unit 20, the inspection target image that has been subjected to be determination, and the restored image obtained in the processing.

2. Processing

2-1. Transformation Data Generation Process

Figure 2:
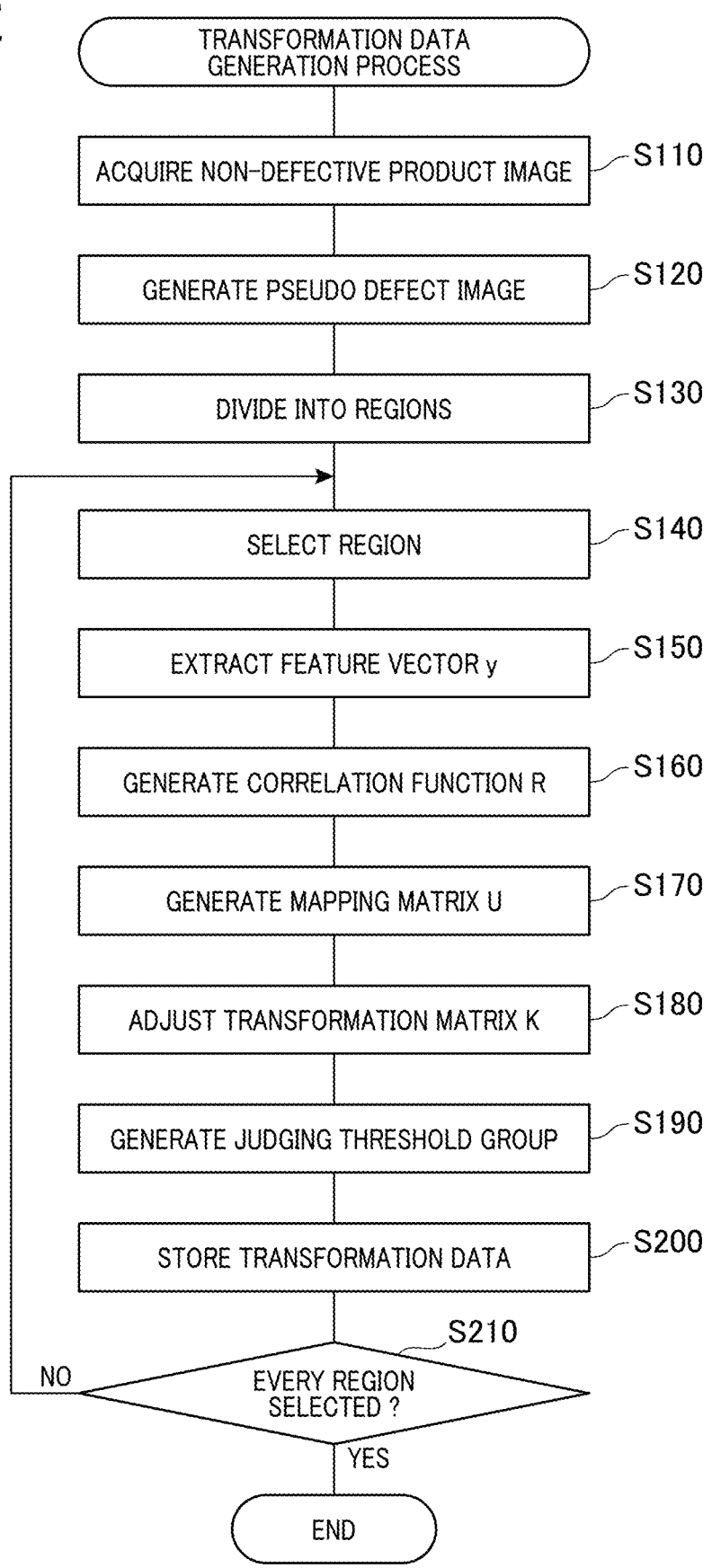
FIG. 2 is a flowchart of a transformation data generating process.

Next, the transformation data generation process performed by the calculation unit 20 will be described with reference to the flowchart of FIG. 2. The present process is activated when a generation instruction is received from the outside via the input unit 10 in a state where a plurality of non-defective product images are stored in the non-defective product image DB 31. For example, the non-defective product images stored in the non-defective product image DB 31 may be acquired from the outside via the input unit 10, or inspection target images determined to be non-defective by the appearance inspection process may be used. Further, as the non-defective product image DB 31, a USB memory or the like, in which non-defective product images are stored, may be connected to a computer serving as the calculation unit 20.

When the present process is activated, the calculation unit 20 acquires a plurality of non-defective product images accumulated in the non-defective product image DB 31 in S110. Here, for example, it is assumed that the number of non-defective product images used is on the order of several thousand.

Figure 3:
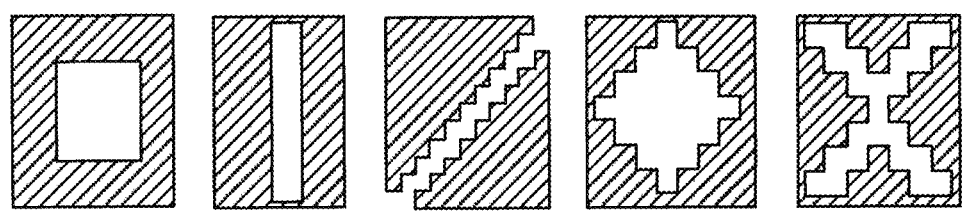
FIG. 3 is an explanatory diagram illustrating a template used to generate a pseudo defect image.

In S120, the calculation unit 20 generates pseudo defect images for some of the acquired non-defective product images and stores them in the learning image DB 32. The pseudo defect images are generated by combining a non-defective product image with a simulated image that simulates defects such as scratches on the surface of the inspection target. Specifically, a plurality of types of templates (that is, shapes of defects) simulating the shapes of defects are prepared, and the template to be used is selected at random. A plurality of simulated images are generated by randomly changing at least one of the size, color, and inclination of the defect represented by the selected template. Pseudo defect images are generated by combining the simulated images with a non-defective product image by randomly changing the position and/or the number on the inspection target shown in the non-defective product images. FIG. 3 shows part of the templates used for generating simulated images, and the white part represents the defect shape. Examples of pseudo defect images generated by combining simulated images with non-defective product images are shown as test images in FIG. 9. In the figure, the black part is the part where the simulated image is combined. The actual color of the simulated image is not limited to black, and a randomly selected color is given. Further, in the three inspection targets shown in the figure, there is unevenness in brightness due to adhesion of dirt, imaging conditions (for example, ambient brightness), or the like. However, the unevenness in brightness are not a defect to be extracted.

Figure 4:
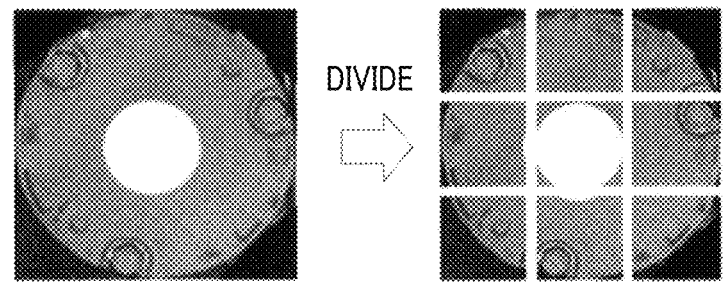
FIG. 4 is an explanatory diagram illustrating an inspection target image and partial images obtained by dividing the inspection target image.

In S130, the calculation unit 20 divides each of the non-defective product images acquired in S110 and the pseudo defect images generated in S120 into a plurality of regions. The non-defective product images used here are non-defective product images other than those used for generating the pseudo defect images. However, the present disclosure is not limited to this, and non-defective product images used for generating the pseudo defect images may be included. Hereinafter, the image of each divided region is referred to as a partial image. In the present embodiment, as shown in FIG. 4, each image is divided into nine regions so that all partial images have substantially the same shape.

In S140, the calculation unit 20 selects one of the regions of the image divided in S130 as a selected region that is not subjected to the processing of S150 to S200 described below.

In S150, the calculation unit 20 generates a feature vector (hereinafter referred to as a non-defective product vector) x from the partial image of the selected region selected in S140 for each of the n non-defective product images that are not used for generating pseudo defect images. n is a positive integer on the order of hundreds to thousands. Here, a d-dimensional vector generated by arranging RGB luminance information of every pixel belonging to the partial image is used as the non-defective product vector x. For example, when the number of pixels of the partial image is m, the dimension of the non-defective product vector x is d=3×m.

In S160, the calculation unit 20 generates an autocorrelation matrix R by using the n non-defective product vectors x generated in S150. Specifically, the autocorrelation matrix R is obtained by equation (2), assuming that a non-defective product vector x is represented by equation (1). T represents transposition of a matrix.

[Eq. 1]

$$x = (x_1, \ldots, x_d)^T \in \mathbb{R}^d \quad (1)$$

$$R = \sum_{i=1}^{n} x_i x_i^T \quad (2)$$

In S170, the calculation unit 20 sets the d-dimensional vector space representing the non-defective product vector x as the entire space, and generates a mapping matrix U representing mapping to a subspace of a lower dimension that best approximates the distribution of the non-defective product vector x generated in S150. Here, the mapping matrix U is generated by KL-expanding the correlation function R obtained in S150 by using equation (3). KL is an abbreviation for Karhunen-Loeve. r is the rank of the autocorrelation function R and is a positive integer that satisfies r<d. The mapping matrix U is an eigenvector matrix of d rows and r columns in which r d-dimensional eigenvectors u 1 to ur are arranged as shown in equation (4), and Λ is an eigenvalue matrix of r rows and r columns having eigenvalues λ as diagonal components as shown in equation (5).

[Eq. 2]

$$R = U \Lambda U^T \quad (3)$$

$$U = (u_1, u_2, \ldots, u_r) \quad (4)$$

$$\Lambda = \text{diag}(\lambda_1, \ldots, \lambda_r) \quad (5)$$

In S180, the calculation unit 20 adjusts each element of the mapping matrix U calculated in S170 by learning using DAE. DAE is an abbreviation for Denoising Auto Encoder. An auto encoder is one obtained by performing supervised learning on a three-layer neural network by using the same data for the input layer and the output layer. DAE refers to an auto encoder obtained by performing learning in which noise is added to the learning data applied to the input layer.

The mapping matrix U is used to generate a feature vector y˜ representing a restored image determined to be non-defective product from the feature vector y extracted from the inspection target image, as shown in equation (6).

Hereinafter, a matrix represented by U×U$^T$, and a matrix represented by V×W are referred to as transformation matrices K. V is a matrix obtained by adjusting U, and W is a matrix obtained by adjusting U$^T$.

[Eq. 3]

$$y\~ = U U^T y \quad (6)$$

Figure 5:
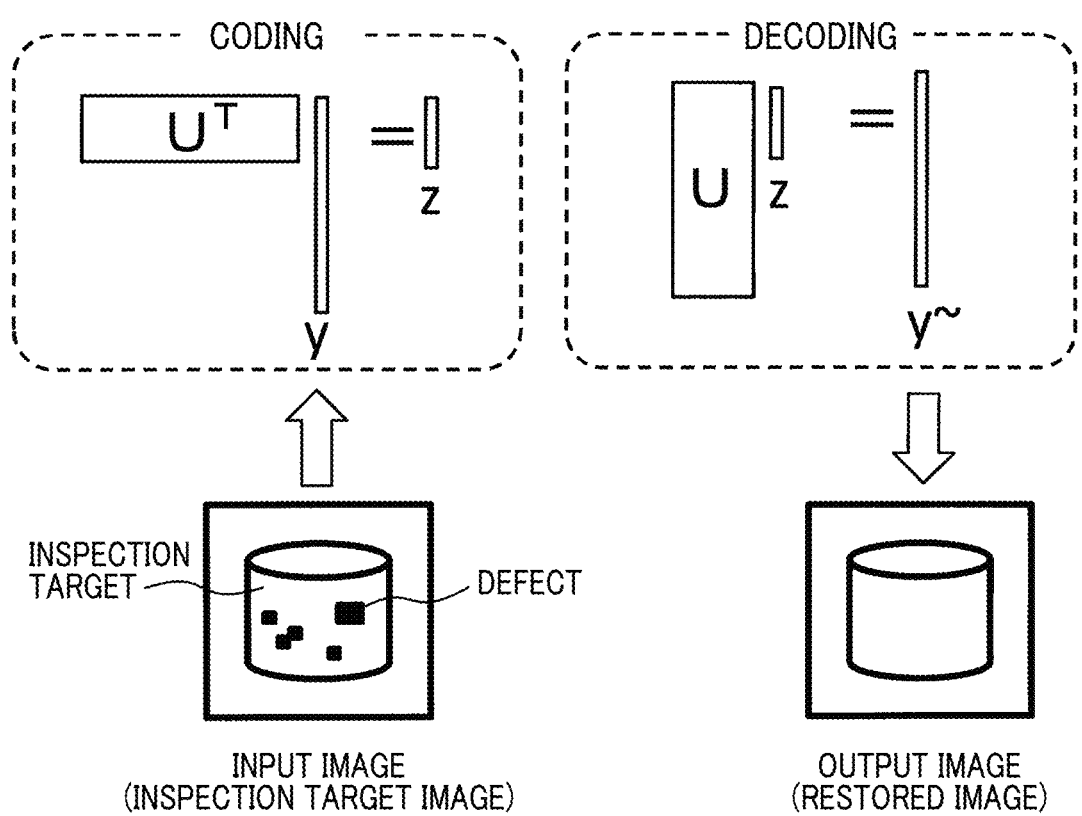
FIG. 5 is an explanatory diagram showing an effect of a transformation matrix.

As shown in FIG. 5, in the transformation matrix K, mapping by the transposed mapping matrix U$^T$ (hereinafter, the first mapping) represents mapping from the entire space to a subspace of a lower dimension representing the feature of a non-defective product image, that is, encoding a feature vector y into a code z with compressed information. As a result of this encoding, a code z in which information related to the defects imparted by the feature vector y is removed is generated. Further mapping by the mapping matrix U of the transformation matrix K (hereinafter referred to as the second mapping) represents mapping from a subspace to the original entire space, that is, decoding the code z into the feature vector y˜. The feature vector y˜ generated by this decoding represents an image lacking information on defects, that is, a restored image determined to be a non-defective product.

Figure 6:
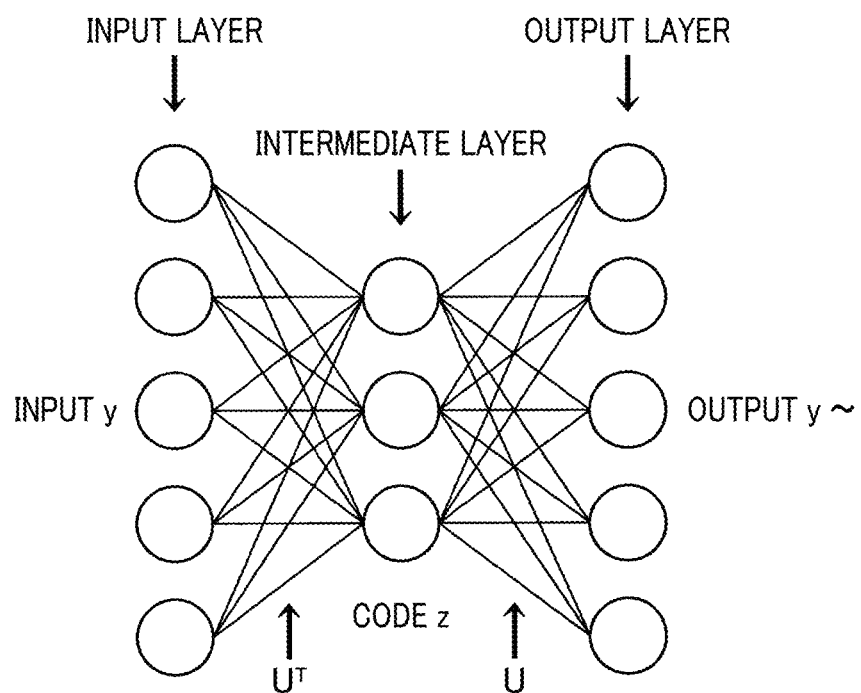
FIG. 6 is an explanatory diagram showing a relationship between a three-layer neural network and the transformation matrix.

Further, the transformation matrix K can be regarded as representing the connection state of the three-layer neural network as shown in FIG. 6. That is, in the transformation matrix K, the first mapping by the transposed mapping matrix U$^T$ represents the connection state from the input layer to the intermediate layer in the three-layer neural network. Further, the second mapping by the mapping matrix U represents the connection state from the intermediate layer to the output layer in the neural network. Thus, a learning method such as back-propagation, which is a well-known learning method in the neural network, can be applied to the learning of the transformation matrix K and also the learning of the mapping matrix U. Further, for the learning by DAE, as the learning data to which noise is added, among the pseudo defect images divided to regions in S130, the one related to the selected region selected in S140 is used.

In S190, the calculation unit 20 sets a judging threshold TH for each pixel of the partial image to determine whether the pixel is a defective portion. Here, LMedS estimation is used. Specifically, using the transformation matrix K calculated in S180, a restored image is generated for each of the partial images related to the selected region of the plurality of non-defective product images. Based on the generated restored images, the standard deviation σ of the restoration error is calculated for each pixel belonging to the partial image. When the standard deviation σ is calculated, first, the median value M of the square of the restoration error is obtained for the pixel to be calculated, and the standard deviation σ is estimated by using the median value M. Based on the estimated standard deviation σ, for example, 2.5σ is set as the judging threshold TH. Hereinafter, the judging threshold TH of each pixel is collectively referred to as a judging threshold group. Note that the coefficient to be multiplied by σ is not limited to 2.5, and an appropriate coefficient may be set based on experimental results.

In S200, the calculation unit 20 stores the adjusted transformation matrix K calculated in S180 and the judging threshold group calculated in S190 as transformation data in the transformation data DB 33. Adjusted mapping matrices V and W may be stored instead of the adjusted conversion matrix K.

In S210, the calculation unit 20 determines whether the processing has been completed for every divided region. If there is an unprocessed region, the process returns to S140, and if the processing has been completed for every region, the present process ends.

By performing the present process, the transformation data DB 33 stores the transformation matrix K calculated for each divided region and the judging threshold TH calculated for each pixel of the input image.

In the present process, S130 corresponds to a dividing section, S150 corresponds to an extracting section, S160 to S170 correspond to a generating section, and S180 corresponds to an adjusting section.

2-2. Appearance Inspection Process

Figure 7:
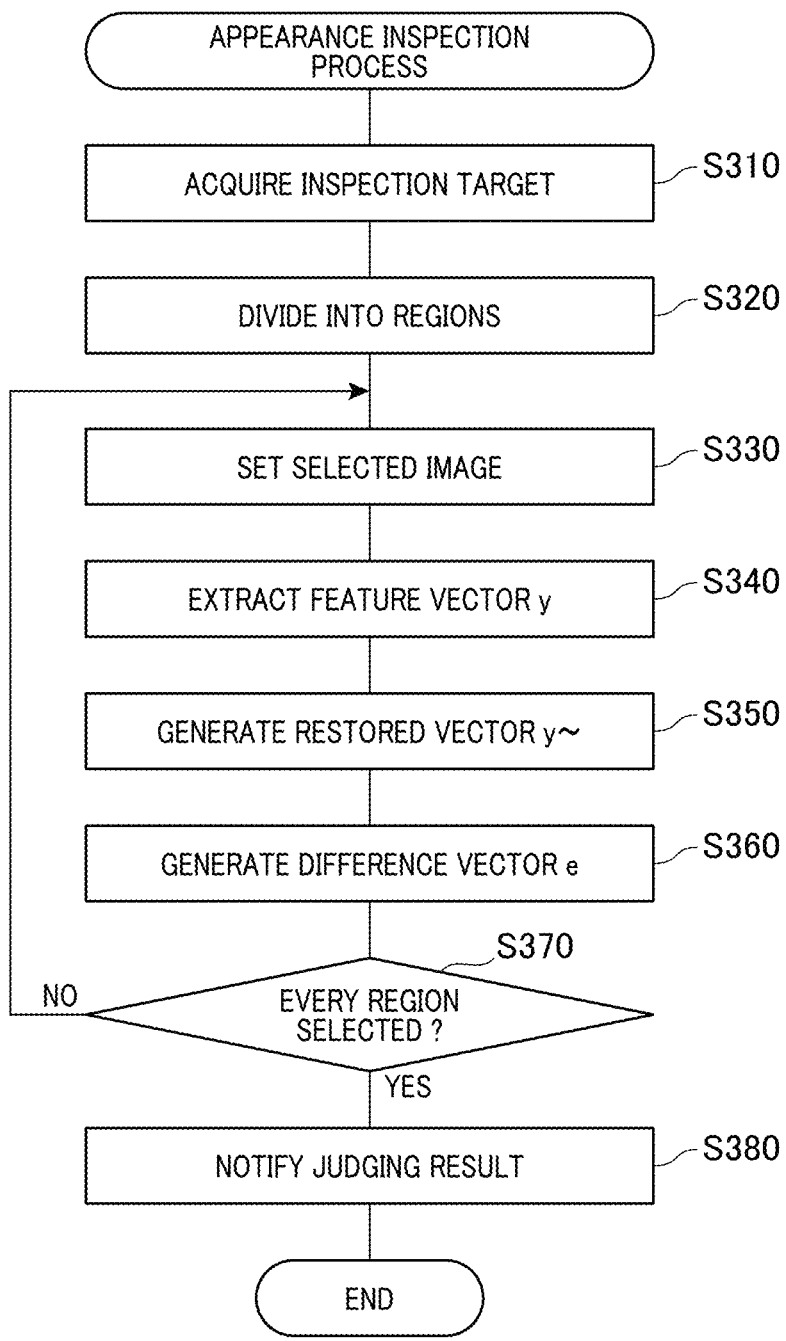
FIG. 7 is a flowchart of an appearance inspection process.

The appearance inspection process executed by the calculation unit 20 will be described with reference to the flowchart of FIG. 7. The present process is activated every time an inspection target image is input to the input unit 10.

When the present process is activated, the calculation unit 20 first acquires an inspection target image via the input unit 10 in S310.

In S320, the calculation unit 20 divides the inspection target image into a plurality of regions as shown in FIG. 4.

In S330, the calculation unit 20 sets, as the selected image, one of the partial images which are images of the respective regions divided in S320.

In S340, the calculation unit 20 extracts a feature vector y from the selected image. The extraction method of the feature vector y is similar to that of the feature vector x extracted from the non-defective product image described above. Hereinafter, the extracted feature vector y is referred to as a selected vector.

In S350, the calculation unit 20 uses the selected vector y extracted in S340 and the transformation matrix K which is the transformation data of the region corresponding to the selected image acquired from the transformation data DB 33, and according to the above-described equation (6), a restored vector $\tilde{y}$, which is a feature vector of the restored image, is generated.

In S360, the calculation unit 20 generates an error vector e representing the difference between the restored vector $\tilde{y}$ and the selected vector y. That is, the error vector e indicates the difference between the inspection target determined as a non-defective product shown in the restored image generated from the restored vector $\tilde{y}$ and the inspection target shown in the inspection target image, in other words, it indicates the defective portion. Each component of the error vector e is binarized using the judging threshold TH of the pixel corresponding to each component, which is acquired from the transformation data DB 33. That is, when a component of the error vector e is 1, it means that the pixel corresponding to the component is determined to be defective, and when a component of the error vector e is 0, it means that the pixel corresponding to the component is determined to be non-defective.

Note that, when the error vector e is generated, the reason for not using a reference vector based on a preset reference image, but instead using the restored vector $\tilde{y}$ generated from the selected vector y is as follows. That is, the inspection targets imaged in the inspection target images all have the same shape and the same size, but depending on the conditions of the imaging, the position of the inspection target may be slightly shifted for each inspection target image, or, when the inspection target is a screw, the phase of the screw thread may be different. Therefore, the state of the inspection target imaged in the reference image does not necessarily match with the state of the inspection target imaged in the inspection target image, and this deviation may cause erroneous detection. In order to suppress such erroneous detection due to a difference in the state of the inspection target, it is necessary to use a restored vector $\tilde{y}$ (that is, a restored image) generated from the selected vector y.

In S370, the calculation unit 20 determines whether the above-described processing of S330 to S360 has been performed for all of the regions divided in S320. If there is an unprocessed region, the calculation unit 20 returns the process to S330, and if all of the regions have been processed, the process proceeds to S380.

In S380, if the components of the error vector e generated for each of the partial images obtained by dividing the inspection target image are all zero, the calculation unit 20 determines that the inspection target captured in the inspection target image is a non-defective product. Further, the calculation unit 20 determines that the inspection target is a defective product if even one component of the error vector e is 1. Then, the calculation unit 20 displays the determination result on the display screen of the output unit 40 together with the inspection target image and an error image reproduced from the error vector e, and finally ends the present process.

In the present process, S310 corresponds to an acquiring section, S340 to S350 correspond to a restoring section, and S360 to S380 correspond to a judging section.

3. Evaluation

Results of evaluation of the performance will be described. In this evaluation, a transformation matrix K and a corresponding matrix were generated for each of the approach of the present disclosure and comparative examples 1 to 4, and pseudo defect images were treated as inspection target images (hereinafter referred to as test images).

In comparative example 1, the initial values of the transformation matrix K were set at random, and each element of the transformation matrix K was adjusted by performing learning by DAE on the transformation matrix K. The number of units of the intermediate layer was set to 2000. Hereinafter, the approach of comparative example 1 is expressed as DAE.

In comparative example 2, the number of units of the intermediate layer was increased to 8000, and the transformation matrix K was generated and adjusted in the same manner as in comparative example 1. Average pooling of 2 pixels×2 pixels was performed on the test image, thereby reducing the resolution of the test image to ½. Hereinafter, the approach of comparative example 2 is expressed as SD_DAE.

In comparative example 3, the transformation matrix K was generated by the subspace method (that is, KL expansion) using a non-defective product image with a resolution halved in the same manner as in comparative example 2. The number of components of the eigenvector was r=3750. Hereinafter, the approach of comparative example 3 is expressed as SD_EV.

In comparative example 4, a transformation matrix K generated in the same manner as in comparative example 3 was used as the initial value, and each element of the transformation matrix K was adjusted by performing learning by DAE. Hereinafter, the approach of comparative example 4 is expressed as SD_EV_DAE.

In the present disclosure, the image was divided into nine regions, and generation and adjusting of the transformation matrix K was performed for each divided portion by using the same manner as in comparative example 4. Hereinafter, the approach of the present disclosure is expressed as local DAE.

Using the transformation matrices K generated and adjusted as above, the appearance inspection process was performed on the test image, and the correct answer number G, the detection number T, and the false detection number F were obtained. The correct answer number G is the total number of pixels having a defect in the test image, and is a known value determined by the test image used. The detection number T is the total number of pixels correctly determined as defects as a result of the appearance inspection process. The false detection number F is the total number of pixels falsely determined to be defective even though they are not actually defective as a result of the appearance inspection process (hereinafter, referred to as false detection number). Further, the judging threshold value TH was adjusted as appropriate so that the highest accuracy can be obtained.

Figure 8:
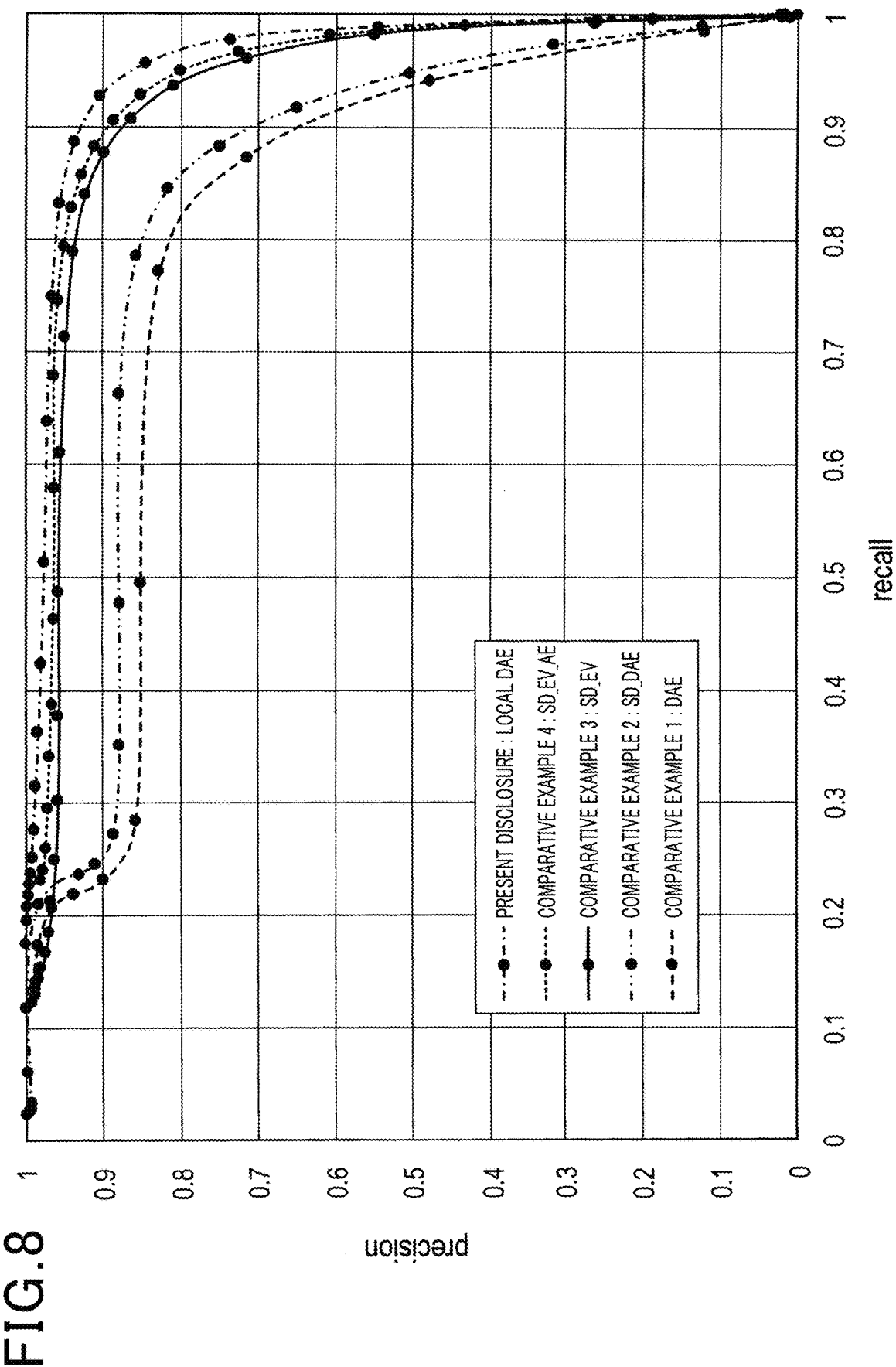
FIG. 8 is a graph showing results of appearance inspection in comparison with other approaches.

The graph shown in FIG. 8 shows precision-recall curves, which shows the relationship between the precision calculated by equation (7) and the recall calculated by equation (8).

[Eq. 4]

$$\text{precision} = \frac{T}{T+F} \quad (7)$$

$$\text{recall} = \frac{T}{G} \quad (8)$$

It can be seen from FIG. 8 that, from the comparison of the present disclosure and comparative example 4 with comparative examples 1 to 3, it is effective to use the transformation matrix K calculated using the subspace method as the initial value, and adjust each element of the transformation matrix K by performing learning by DAE. Further, from the comparison between the present disclosure and comparative example 4, it can be understood that the local DAE is effective which performs processing by dividing the image instead of processing the whole image at once.

FIG. 9 shows, for each of the three test images, a correct answer image GT indicating the positions of pixels having a pseudo defect, an error image generated using a restored image provided by local DAE of the present disclosure, an error image generated using a restored image provided by SD_EV of comparative example 3, and an error image generated using a restored image provided by SD_EV_DAE of comparative example 4.

In the test image in the first row of the figure, there is a black pseudo defect in the white part of the detection target. At this time, since the difference in luminance from a normal sample is large, in comparative example 3, many false detections appear around the pseudo defect. In comparative example 4 and the approach of the present disclosure, the portion of the pseudo defect is correctly detected. Further, in the approach of the present disclosure, the number of pixels determined to have defects other than the pseudo defect (that is, the false detection number) is significantly reduced as compared with comparative example 4.

In the test images of the second and third rows, there are green and purple pseudo defects in places other than the white portion of the detection target. These cases also show the same tendency as the test image of the first row.

4. Advantageous Effects

According to the first embodiment described above in detail, the following effects can be obtained.

(1) The appearance inspection device 1 determines whether the inspection target is defective or not from an error vector e (that is, an error image) which is the difference between the feature vector y (that is, the inspection target image) and the restored vector y˜ (that is, the restored image). Thus, as long as the inspection target imaged in the inspection target image is different from the restored inspection target determined to be non-defective shown in the restored image, even an unknown defect can be detected, and it is possible to improve the accuracy of the appearance inspection of the inspection target.

(2) The appearance inspection device 1 uses, as the transformation data used for generating a restored image, a transformation matrix K adjusted by applying DAE which is learning using a pseudo defect image, instead of directly using a transformation matrix generated by KL expansion of the correlation function R based on the feature vector x extracted from a non-defective product image, in other words, a transformation matrix generated using the subspace method. Therefore, it is possible to further improve the accuracy of the restored image generated by the transformation data, and thus improve the accuracy of the appearance inspection of the inspection target.

(3) The appearance inspection device 1 divides the inspection target image into a plurality of regions, and, for each of the divided regions, generates transformation data and performs appearance inspection using the transformation data. Accordingly, it is possible to prevent the noise generated due to a part of the area of the inspection target image from spreading to the other part, and to generate a restored image with a higher quality. Thus, the accuracy of the appearance inspection can be further improved.

5. Other Embodiments

Embodiments for implementing the present disclosure have been described above, but the present disclosure is not limited to the above-described embodiments and can be implemented with various modifications.

(a) In the above embodiment, the inspection target image and the non-defective product image are divided into a plurality of regions for processing, but the inspection target image and the non-defective product image may be processed as they are without dividing them.

(b) A plurality of functions of a single component of the above embodiment may be implemented by a plurality of components, or a single function of a single component may be implemented by a plurality of components. Further, a plurality of functions of a plurality of components may be implemented by a single component, or a single function implemented by a plurality of components may be implemented by a single component. Furthermore, a part of the configuration of the above embodiments may be omitted. Furthermore, at least a part of the configuration of the above embodiment may be added to or substituted for the configuration of the other embodiments described above. Note that all of the modes included in the technical spirit specified from the wording of the claims are embodiments of the present disclosure.

(c) In addition to the above-described appearance inspection device, the present disclosure can be implemented in various modes, such as a transformation data generation device which does not have the function of the appearance inspection process such as of the appearance inspection device, a system including the appearance inspection device or the transformation data generation device as a constituent element, a program for causing a computer to function as the appearance inspection device or the transformation data generation device, a non-transitory substantial recording medium such as a semiconductor memory in which the program is recorded, an appearance inspection method, and a transformation data generation method.

An appearance inspection device according to an aspect of the present disclosure includes an acquisition section (S310), a restoring section (S340, S350), a judging section (S360, S380), an extraction section (S150), a generation section (S160, S170), and an adjusting section (S180).

The acquisition section acquires an inspection target image representing an appearance of an inspection target. The restoring section generates a restored image representing an appearance determined to be a non-defective product from the inspection target image acquired by the acquisition section by using preset transformation data. The judging section determines whether the inspection target captured in the inspection target image is defective or not from a difference between the inspection target image and the restored image. The extraction section extracts, from each of a plurality of non-defective product images which shows the appearance of the inspection target determined to be a non-defective product, a non-defective product vector which is a feature vector representing a feature of each non-defective product image. The generation section generates a transformation matrix by using the non-defective vectors extracted by the extraction section. The transformation matrix is a matrix representing sequentially performing first mapping for mapping the feature vector to a feature space and second mapping for mapping a result of the first mapping to the whole space. The whole space is a vector space represented by the feature vector, and the feature space is a subspace of the whole space that approximates a distribution of the non-defective vector. The adjusting section adjusts each element of the transformation matrix generated by the generation section by using the feature vector extracted from a pseudo defect image obtained by combining the non-defective product image with an image representing a defect as learning data. The restoring section uses the transformation matrix adjusted by the adjusting section as the transformation data to generate the restored image.

According to such a configuration, whether the inspection target is defective or not can be determined from the difference between the inspection target image and the restored image. Thus, as long as the inspection target imaged in the inspection target image is different from the inspection target determined to be non-defective product shown in the restored image, even an unknown defect can be detected, and it is possible to improve the accuracy of the appearance inspection of the inspection target.

Further, the transformation data used for generating the restored image is adjusted by learning using the pseudo defect image, instead of directly using the transformation matrix generated using the non-defective product image. Therefore, it is possible to further improve the accuracy of the restored image generated by the transformation data, and thus improve the accuracy of the appearance inspection of the inspection target.

A transformation data generating device according to an aspect of the present disclosure includes an extraction section (S150), a generation section (S160, S170), and an adjusting section (S180). A program according to an aspect of the present disclosure causes a computer to function as an extraction section (S150), a generation section (S160, S170), and an adjusting section (S180). The extraction section, the generation section, and the adjusting section of the transformation data generating device and the program are the same as those described in connection with the appearance inspection device.

According to such a configuration, it is possible to generate transformation data that enables highly accurate restoration to an image representing a non-defective product, and by using the generated transformation data, the accuracy of the appearance inspection of the inspection target can be improved.

What is claimed is:

1. An appearance inspection device comprising:
    an acquisition section configured to acquire an inspection target image representing an appearance of an inspection target;
    a restoring section configured to generate a restored image representing an appearance determined to be a non-defective product from the inspection target image acquired by the acquisition section by using preset transformation data;
    a judging section configured to determine whether the inspection target captured in the inspection target image is defective or not from a difference between the inspection target image and the restored image;
    an extraction section configured to extract, from each of a plurality of non-defective product images which shows the appearance of the inspection target determined to be a non-defective product, a non-defective product vector which is a feature vector representing a feature of each non-defective product image;
    a generation section configured to generate a transformation matrix by using each of the non-defective product vectors extracted by the extraction section, the transformation matrix being a matrix representing sequentially performing a first mapping for mapping all of the plurality of non-defective product vectors to a feature space and a second mapping for mapping a result of the first mapping to a whole space, the whole space being a vector space represented by all of the plurality of non-defective product vectors, the feature space being a subspace of the whole space that approximates a distribution of all of the plurality of non-defective product vectors; and
    an adjusting section configured to adjust each element of the transformation matrix generated by the generation section by using another non-defective product vector extracted from a pseudo defect image obtained by combining one of the plurality of non-defective product images with an image representing a defect as learning data, wherein
    the restoring section is configured to use the transformation matrix adjusted by the adjusting section as the transformation data.

2. A transformation data generating device that generates transformation data for generating a restored image representing an appearance determined to be a non-defective product from an inspection target image representing an appearance of an inspection target, comprising:
    an extraction section configured to extract, from each of a plurality of non-defective product images which show the appearance of the inspection target determined to be a non-defective product, a non-defective product vector which is a feature vector representing a feature of each non-defective product image;

a generation section configured to generate a transformation matrix by using each of the non-defective product vectors extracted by the extraction section, the transformation matrix being a matrix representing sequentially performing a first mapping for mapping all of the plurality of non-defective product vectors to a feature space and a second mapping for mapping a result of the first mapping to a whole space, the whole space being a vector space represented by all of the plurality of non-defective product vectors, the feature space being a subspace of the whole space that approximates a distribution of all of the plurality of non-defective product vectors; and an adjusting section configured to generate the transformation data by adjusting each element of the transformation matrix generated by the generation section by using, as learning data, another non-defective product vector extracted from a pseudo defect image obtained by combining one of the plurality of non-defective product images with an image representing a defect.

3. The transformation data generating device according to claim 2, further comprising a dividing section configured to divide each of the plurality of non-defective product images into a plurality of partial images, wherein the extraction section, the generation section, and the adjusting section are configured to perform processing for each portion represented by the partial images divided by the dividing section.

4. The transformation data generating device according to claim 2, wherein the generation section is configured to obtain the transformation matrix by generating an autocorrelation matrix from all of the plurality of non-defective product vectors extracted by the extraction section, and performing a Karhunen-Loeve expansion on the autocorrelation matrix.

5. The transformation data generating device according to claim 2, wherein the adjusting section is configured to assume the transformation matrix as an intermediate layer of a neural network and adjust each element of the transformation matrix by applying a denoising autoencoder.

6. A program that generates transformation data for generating a restored image representing an appearance determined to be non-defective product from an inspection target image representing an appearance of an inspection target, the program being configured to cause a computer to function as:

an extraction section configured to extract, from each of a plurality of non-defective product images which show the appearance of the inspection target determined to be non-defective product, a non-defective product vector which is a feature vector representing a feature of each non-defective product image;

a generation section configured to generate a transformation matrix by using each of the non-defective product vectors extracted by the extraction section, the transformation matrix being a matrix representing sequentially performing a first mapping for mapping all of the plurality of non-defective product vectors to a feature space and a second mapping for mapping a result of the first mapping to a whole space, the whole space being a vector space represented by all of the plurality of non-defective product vectors, and the feature space being a subspace of the whole space that approximates a distribution of all of the plurality of non-defective product vectors; and an adjusting section configured to generate the transformation data by adjusting each element of the transformation matrix generated by the generation section by using, as learning data, another non-defective product vector extracted from a pseudo defect image obtained by combining one of the plurality of non-defective product images with an image representing a defect.

* * * * *